(12) United States Patent
Boyce et al.

(10) Patent No.: US 9,161,033 B2
(45) Date of Patent: Oct. 13, 2015

(54) DECODING METHOD AND APPARATUS ENABLING FAST CHANNEL CHANGE OF COMPRESSED VIDEO

(75) Inventors: Jill MacDonald Boyce, Manalapan, NJ (US); Alexandros Michael Tourapis, West Windsor, NJ (US); Jeffrey Allen Cooper, Rocky Hill, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 2633 days.

(21) Appl. No.: 10/559,643

(22) PCT Filed: Jun. 15, 2004

(86) PCT No.: PCT/US2004/018764
§ 371 (c)(1),
(2), (4) Date: Dec. 2, 2005

(87) PCT Pub. No.: WO2004/114668
PCT Pub. Date: Dec. 29, 2004

(65) Prior Publication Data
US 2007/0098079 A1 May 3, 2007

Related U.S. Application Data

(60) Provisional application No. 60/478,923, filed on Jun. 16, 2003.

(51) Int. Cl.
*H04N 5/44* (2011.01)
*H04N 5/50* (2006.01)
(Continued)

(52) U.S. Cl.
CPC ....... *H04N 19/00436* (2013.01); *H04N 5/4401* (2013.01); *H04N 5/50* (2013.01);
(Continued)

(58) Field of Classification Search
USPC .................. 375/240, 240.01, 240.02, 240.21, 375/240.25
See application file for complete search history.

(56) References Cited

U.S. PATENT DOCUMENTS 6,118,498 A * 9/2000 Reitmeier ..................... 348/725
6,480,541 B1 * 11/2002 Girod et al. ............... 375/240.12
(Continued)

FOREIGN PATENT DOCUMENTS

| EP | 0 883 299 | 12/1998 |
|---|---|---|
| JP | 11-289539 | 10/1999 |
| JP | 2001-527351 | 12/2001 |

OTHER PUBLICATIONS

R. Kurceren et al., "Synchronization-Predictive Coding for Video Compression: The SP Frames Design for JVT/H.26L", Nokia Research Center, Nokia, Inc., Irving, TX 75039, IEEE ICIP 2002, pp. II-497-II-500.
(Continued)

*Primary Examiner* — Fan Zhang
(74) *Attorney, Agent, or Firm* — Robert D. Shedd; Vincent E. Duffy; Palak Bhakta

(57) ABSTRACT

A video decoder, and corresponding method are described for enabling fast channel change of compressed video, where a video decoder for receiving compressed stream data and providing decompressed video output includes a demultiplexor for receiving the compressed stream data and separating the normal stream and the channel change stream, a normal decoding portion in signal communication with the demultiplexor for selectably receiving the compressed normal and channel change streams, and providing decompressed video output, and a normal frame store in signal communication with the normal decoding portion for storing reference pictures.

11 Claims, 5 Drawing Sheets

(51) Int. Cl.

| | | |
|---|---|---|
| H04N 21/2365 | (2011.01) | |
| H04N 21/2662 | (2011.01) | |
| H04N 21/434 | (2011.01) | |
| H04N 19/00 | (2014.01) | |
| H04N 21/2343 | (2011.01) | |
| H04N 21/4402 | (2011.01) | |
| H04N 21/845 | (2011.01) | |
| H04N 21/462 | (2011.01) | |
| H04N 19/33 | (2014.01) | |
| H04N 21/438 | (2011.01) | |
| H04N 19/105 | (2014.01) | |
| H04N 19/159 | (2014.01) | |
| H04N 19/172 | (2014.01) | |
| H04N 19/61 | (2014.01) | |
| H04N 19/107 | (2014.01) | |
| H04N 19/132 | (2014.01) | |
| H04N 19/162 | (2014.01) | |
| H04N 19/174 | (2014.01) | |
| H04N 19/44 | (2014.01) | |
| H04N 19/39 | (2014.01) | |
| H04N 19/527 | (2014.01) | |
| H04N 19/587 | (2014.01) | |
| H04N 19/86 | (2014.01) | |
| H04N 19/573 | (2014.01) | |
| H04N 19/58 | (2014.01) | |
| H04N 19/59 | (2014.01) | |
| H04N 19/70 | (2014.01) | |

(52) U.S. Cl.
CPC ............ *H04N 19/00* (2013.01); *H04N 19/105* (2014.11); *H04N 19/107* (2014.11); *H04N 19/132* (2014.11); *H04N 19/159* (2014.11); *H04N 19/162* (2014.11); *H04N 19/172* (2014.11); *H04N 19/174* (2014.11); *H04N 19/33* (2014.11); *H04N 19/39* (2014.11); *H04N 19/44* (2014.11); *H04N 19/527* (2014.11); *H04N 19/573* (2014.11); *H04N 19/58* (2014.11); *H04N 19/587* (2014.11); *H04N 19/59* (2014.11); *H04N 19/61* (2014.11); *H04N 19/86* (2014.11); *H04N 21/2365* (2013.01); *H04N 21/23439* (2013.01); *H04N 21/234363* (2013.01); *H04N 21/234381* (2013.01); *H04N 21/2662* (2013.01); *H04N 21/4347* (2013.01); *H04N 21/4384* (2013.01); *H04N 21/440263* (2013.01); *H04N 21/440281* (2013.01); *H04N 21/4621* (2013.01); *H04N 21/8451* (2013.01); *H04N 19/70* (2014.11)

(56) References Cited

U.S. PATENT DOCUMENTS

| | | | |
|---|---|---|---|
| 6,549,720 B1 | 4/2003 | Yamada et al. | |
| 6,587,505 B1 | 7/2003 | Nozawa et al. | |
| 6,873,368 B1 | 3/2005 | Yu et al. | |
| 7,143,432 B1 * | 11/2006 | Brooks et al. | 725/105 |
| 7,430,222 B2 | 9/2008 | Green et al. | |
| 7,457,415 B2 | 11/2008 | Reitmeier et al. | |
| 7,675,972 B1 * | 3/2010 | Laksono et al. | 375/240.12 |
| 2001/0011304 A1 | 8/2001 | Wesinger, Jr. et al. | |
| 2003/0007562 A1 | 1/2003 | Kerofsky et al. | |
| 2003/0072370 A1 | 4/2003 | Girod et al. | |
| 2003/0169724 A1 | 9/2003 | Mehta et al. | |
| 2003/0196211 A1 | 10/2003 | Chan | |
| 2004/0034864 A1 | 2/2004 | Barrett et al. | |
| 2004/0181813 A1 | 9/2004 | Ota et al. | |
| 2004/0194134 A1 * | 9/2004 | Gunatilake et al. | 725/38 |
| 2005/0053086 A1 | 3/2005 | Mehta et al. | |
| 2005/0138668 A1 | 6/2005 | Gray et al. | |
| 2005/0229221 A1 | 10/2005 | Kerofsky et al. | |
| 2006/0117360 A1 | 6/2006 | Cooper et al. | |

OTHER PUBLICATIONS

Marta Karczewicz and Ragip Kurceren; A Proposal for SP-frames; ITU—Telecommunications Standardization Sector; VCEG-L27; Jan. 9, 2001; XP-002287038; pp. 1-9; Ebisee, Germany.

Uwe Horn, K. Stuhlmuller, M. Link, and B. Girod; Robust Internet video transmission based on scalable coding and unequal error protection; Signal Processing: Image Communication; vol. 15; Sep. 1999; pp. 77-94.

Kemal Ugur and Panos Nasiopoulos; Combining Bitstream Switching and FGS for H.264 Scalable Video Transmission Over Varying Bandwidth Networks; 2003 IEEE Pacific Rim Conference on Communications Computers and Signal Processing; vol. 2; Aug. 28, 2003; pp. 972-975; University of British Columbia, Vancouver, British Columbia, Canada.

Search Report dated Nov. 9, 2004.

Wakerly, John F., Digital Design Principles and Practices, pp. 278-283, copyright 1990, Princeton-Hall.

Ramamurthy, G., et al., "Modeling and Analysis of a Variable Bit Rate Video Multiplexer", IEEE INFOCOM '92, pp. 817-827, copyright 1992.

\* cited by examiner

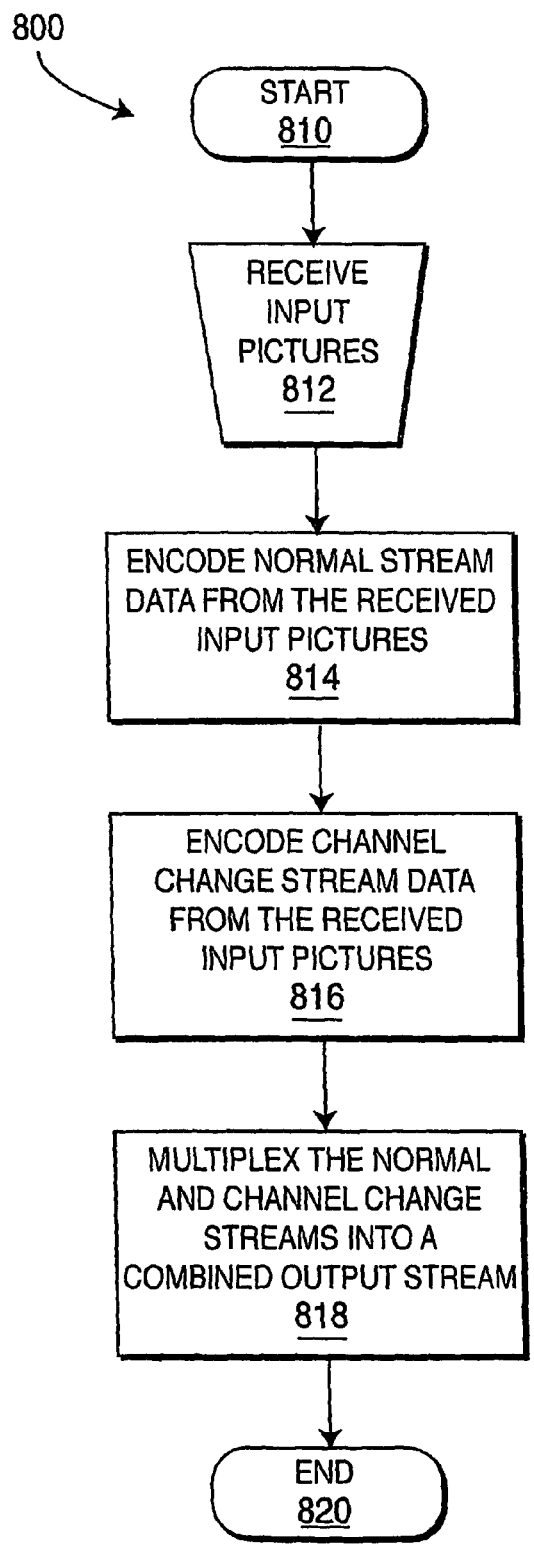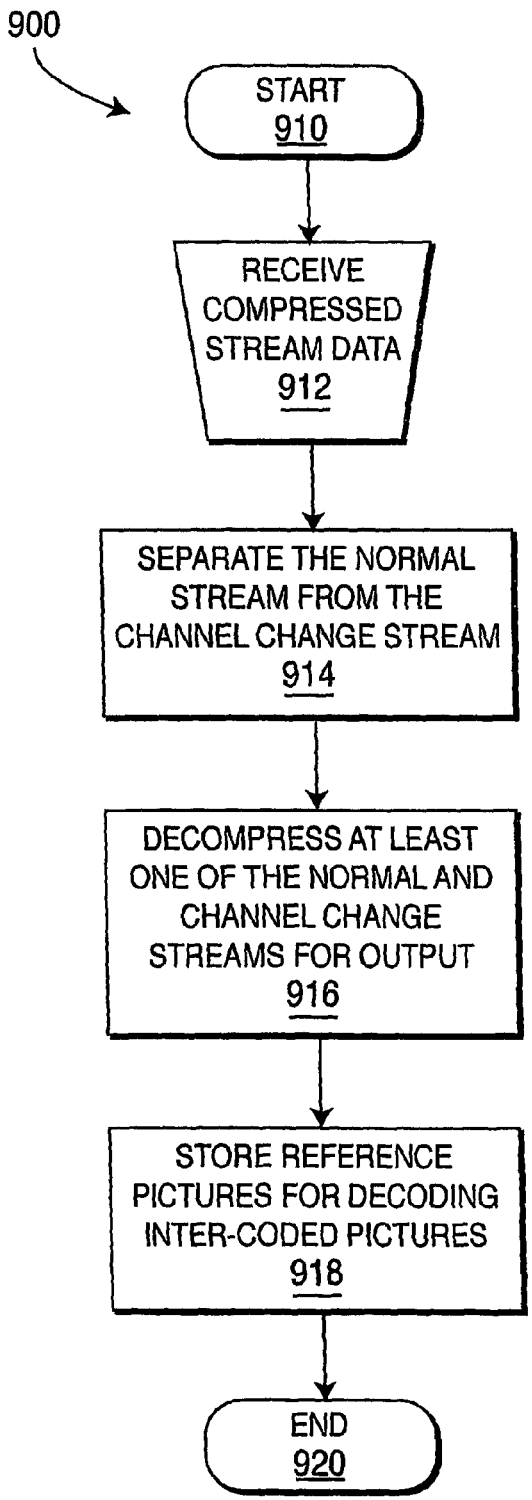
FIG. 8
FIG. 9

US 9,161,033 B2

DECODING METHOD AND APPARATUS ENABLING FAST CHANNEL CHANGE OF COMPRESSED VIDEO

CROSS-REFERENCE TO RELATED APPLICATION

This application claims the benefit, under 35 U.S.C. §365 of International Application PCT/US04/18764, filed Jun. 15, 2004, which was published in accordance with PCT Article 21(2) on Dec. 29, 2004 in English and which claims the benefit of U.S. provisional patent application No. 60/478,923, filed Jun. 16, 2003.

FIELD OF THE INVENTION

The present invention is directed towards video encoders and decoders (CODECs), and more particularly, towards an apparatus and method for reducing the perceived delay for the initial display of decoded video content following a channel change.

BACKGROUND OF THE INVENTION

Popular video compression standards, such as MPEG-2 and JVT/H.264/MPEG AVC, use intra and inter coding. For proper decoding, a decoder decodes a compressed video sequence beginning with an intra-coded (I) picture, and then continues to decode the subsequent inter-coded (P and B) pictures. A Group of Pictures (GOP) may include an I picture and several subsequent P and B pictures. I pictures typically require many more bits to code than does a P or B picture of equivalent video quality.

When a receiver initially begins receiving a program on a particular channel, such as following a channel change or initial turning on of the receiver, it must wait until an I picture is received to begin decoding properly, which causes a delay. To minimize channel change delay in digital video broadcast systems, I pictures are typically sent frequently, such as every N pictures. For example, to enable ½ second delay of the video decompression portion of the system, it is common to use N=15 for 30 fps content. Because compressed I pictures are so much larger than compressed P and B pictures, this considerably increases the bitrate over what would be required if I pictures were not inserted so frequently.

Most broadcast systems transmit I pictures frequently, for example every ½ second, in order to limit the channel change delay time due to the video decoding system. In some systems, instead of sending full I pictures frequently, a technique called "progressive refresh" is used, where sections of pictures are intra coded. Typically, all macroblocks in the picture are intra-coded at least once during an N-picture period.

In the JVT/H.264/MPEG AVC compression standard, P and B pictures may be predicted using multiple reference pictures, including the pictures before a preceding I picture. The standard identifies random access points as Independent Decoder Refreshes, or IDRs, which constrain that no reference pictures before each IDR are used in predicting pictures following the IDR.

The JVT/H.264/MPEG AVC compression standard includes a tool called redundant pictures, defined in the standard as:
 redundant coded picture: A coded representation of a picture or a part of a picture. The content of a redundant coded picture shall not be used by the decoding process for a bitstream conforming to this Recommendation I International Standard. A redundant coded picture is not required to contain all macroblocks in the primary coded picture. Redundant coded pictures have no normative effect on the decoding process. See also primary coded picture.

The slice header contains a redundant_pic_cnt field, whose semantics are defined as:
 redundant_pic_cnt shall be equal to 0 for slices and slice data partitions belonging to the primary coded picture. The redundant_pic_cnt shall be greater than 0 for coded slices and coded slice data partitions in redundant coded pictures. When redundant_pic_cnt is not present, its value shall be inferred to be equal to 0. The value of redundant_pic_cnt shall be in the range of 0 to 127, inclusive.
 If the syntax elements of a slice data partition A RBSP indicate the presence of any syntax elements of category 3 in the slice data for a slice, a slice data partition B RBSP shall be present having the same value of slice_id and redundant_pic_cnt as in the slice data partition A RBSP.
 Otherwise (the syntax elements of a slice data partition A RBSP do not indicate the presence of any syntax elements of category 3 in the slice data for a slice), no slice data partition B RBSP shall be present having the same value of slice_id and redundant_pic_cnt as in the slice data partition A RBSP.

Accordingly, what is needed is an apparatus and method for reducing the perceived delay for the initial display of decoded video content following a channel change.

SUMMARY OF THE INVENTION

These and other drawbacks and disadvantages of the prior art are addressed by an apparatus and method that provide for fast channel change of compressed video content.

A video decoder for receiving compressed stream data and providing decompressed video output includes a demultiplexor for receiving the compressed stream data and separating the normal stream and the channel change stream, a normal decoding portion in signal communication with the demultiplexor for receiving the compressed normal and channel change streams, and providing decompressed video output, and a normal frame store in signal communication with the normal decoding portion for storing reference pictures.

These and other aspects, features and advantages of the present invention will become apparent from the following description of exemplary embodiments, which is to be read in conjunction with the accompanying drawings.

BRIEF DESCRIPTION OF THE DRAWINGS

The present invention may be better understood in accordance with the following exemplary figures, in which:

FIG. 8 is a flow chart of a video encoding method in accordance with principles of the present invention; and FIG. 9 is a flow chart of a video decoding method in accordance with principles of the present invention.

DETAILED DESCRIPTION OF PREFERRED EMBODIMENTS

Figure 1:
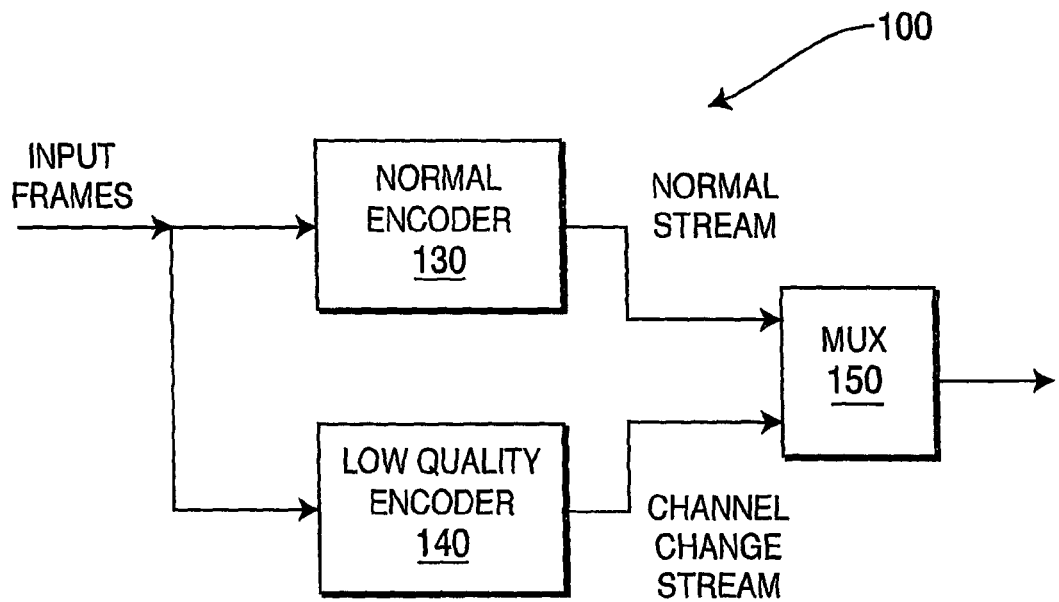
FIG. 1 shows a block diagram for an encoder using normal resolution for the channel change stream in accordance with principles of the present invention.

Embodiments of the present invention provide allow channel change delay at any desired rate with a lower bitrate than prior art methods. That is, the invention enables low delay channel change time in a compressed video broadcast system, while significantly reducing the bitrate over prior methods of enabling low-delay channel change. In the JVT/H.264/MPEG AVC standard, individual P and B pictures are coded using one or more different slice types (I, P and/or B), while I pictures are coded using only I slices. Accordingly, in the description that follows, the term "slice" may be substituted for the term "picture" depending on the context and applicable standard. Prior art systems broadcast I pictures frequently to enable channel change, for example every N pictures. In embodiments of the present invention, normal I pictures are sent less frequently, and additional lower quality I pictures are sent more frequently.

In accordance with the principles of the present invention, a desired channel change delay can be achieved without requiring I pictures to be sent as frequently as is done in prior art systems. Instead, additional lower quality coded pictures, included in what is herein called the channel change stream, are sent in addition to the normal quality coded pictures. In the channel change stream, lower quality I pictures are sent at the desired channel change frequency, and are used at the decoder during the initial period following a channel change. Normal quality I pictures are sent in the normal stream at a lower frequency, and are used at the decoder once they are available.

For example, consider a system that sends I pictures in the normal stream every N*K pictures and lower quality I pictures in the channel change stream every N pictures, with K>1. Each coded picture in the channel change stream corresponds to a normal stream coded picture. Thus, when a coded picture is present in the channel change stream, two coded representations of that picture are actually transmitted.

When a channel change occurs, a decoding system starts decoding the compressed video as soon as it receives an I picture, either from the normal stream or from the channel change stream. If the first I picture to arrive is from the normal stream, the decoder continues normally. However, if the first I picture to arrive is a lower quality I picture from the channel change stream, the decoder decodes and uses the lower quality I picture. This causes lower quality video to be displayed until a normal quality I picture arrives. This period of lower quality video is not significantly noticeable to a viewer as it is of short duration and immediately follows a channel change. The human visual system takes some time to adjust to a new visual scene.

The channel change stream may either contain only lower quality I pictures, or may contain lower quality I, P and B pictures. The picture rate of the channel change stream may be lower than that of the normal stream. The lower quality pictures may be of the same resolution as the normal pictures but encoded at a lower bitrate, or may be of a lower resolution than the normal pictures. The bitstream size of the lower quality I coded pictures in the channel change stream are small compared with the size of normal quality coded I pictures in the normal stream. So even though additional coded representations of the same picture are being transmitted, overall bitrate savings occur because the size of a normal quality P or B picture plus the lower quality I picture is typically significantly less than that of a normal quality I picture alone.

If the channel change stream contains low quality I, P and B pictures, after a channel change the decoder system waits for the arrival of a lower quality I picture, and then it decodes and displays the lower quality pictures from the channel change stream until a normal quality I picture is received, at which point it switches to the normal quality stream.

If the channel change stream contains only I pictures, the decoding system waits for the arrival of an I picture in either the normal stream or channel change stream after a channel change. If the first I picture to arrive is in the channel change stream, the decoding system decodes and displays the lower quality I picture. Then this lower quality picture is stored in the normal decoder picture stores and the decoding system begins decoding the subsequent normal stream P and B pictures, using the lower quality I picture from the channel change stream as a reference. Because these normal quality P and B pictures were inter-coded based on prior pictures in the normal stream rather than the corresponding lower quality I picture from the channel change stream, this will cause some decoding drift.

Experiments have shown, however, that the visual impact of such drift is small in this situation, because it lasts for only a short duration and immediately follows a scene change corresponding to the channel change. The encoder can manage how much drift would occur and adjust coding parameters of the normal and/or channel change stream pictures appropriately such that drift does not exceed reasonable limits.

The instant description illustrates the principles of the invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As shown in FIG. 1, an encoder in accordance with principles of the present invention is indicated generally by the reference numeral 100. The encoder 100 uses the same resolution for each of the normal stream and the channel change stream, and includes a normal encoder portion 130 for producing the normal stream and a low-quality encoder portion 140 for producing the channel change stream, each receiving the same resolution input pictures. The normal portion 130 and the low-quality portion 140 are each coupled in signal communication with a multiplexor (mux) 150, for providing the normal and channel change streams, respectively, to the mux 150 for transmission.

Figure 2:
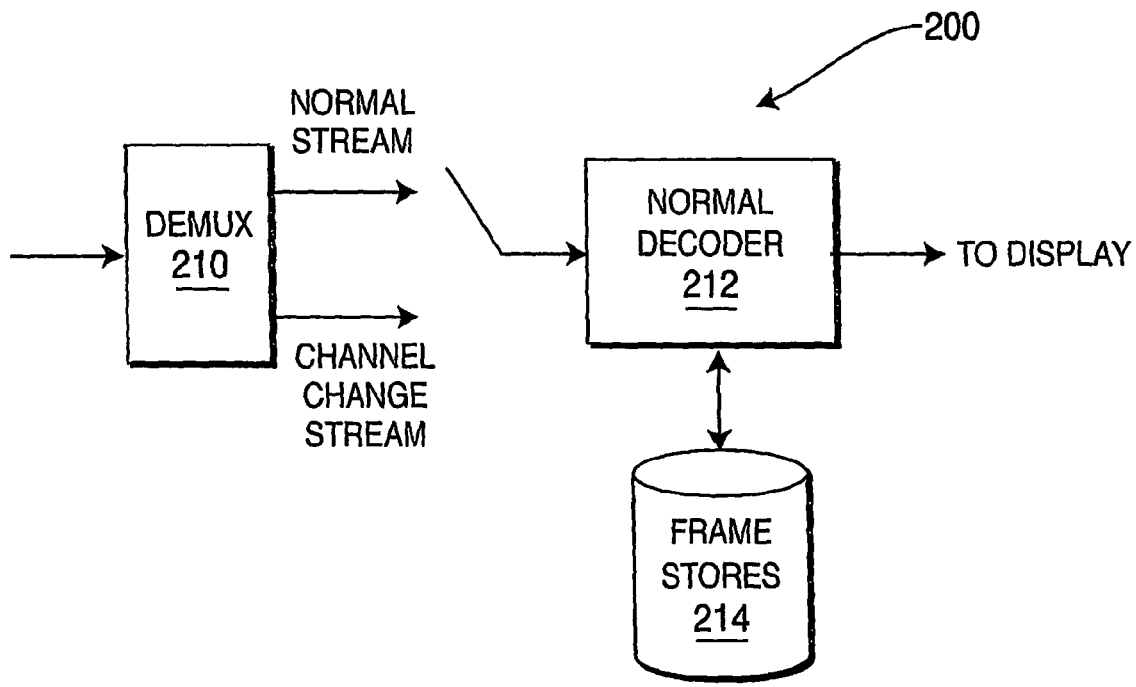
FIG. 2 shows a block diagram for a decoder using normal resolution for the channel change stream in accordance with principles of the present invention.

Turning to FIG. 2, a decoder in accordance with principles of the present invention is indicated generally by the reference numeral 200. The decoder 200 uses the same resolution for each of the normal stream and the channel change stream, and includes a demultiplexor (demux) 210 for receiving compressed video data and demultiplexing the normal and channel change streams, each coupled in selectable signal communication with a normal decoder portion 212. The normal decoder portion 212 is coupled in signal communication with frame stores 214, and outputs decoded video to a display.

Thus, FIG. 1 shows an encoding system and FIG. 2 shows a decoding system that each use the same resolution images for both the normal stream and the channel change stream. In operation, the normal encoder portion creates normal quality compressed video pictures for the normal stream, and a parallel low-quality encoder portion creates lower quality compressed video pictures for the channel change stream. The encoder 100 shows two separate encoder blocks for the two encoder functions, but, as will be recognized by those of ordinary skill in the pertinent art, the two encoder functions could be performed using the same encoder device. The normal stream and channel change stream are multiplexed together, if necessary, and transmitted. In the decoding system, a demux separates the normal stream and channel change stream, and a selection is made as to whether the picture from the normal stream or the channel change stream should be sent to the decoder.

Figures 3, 4:
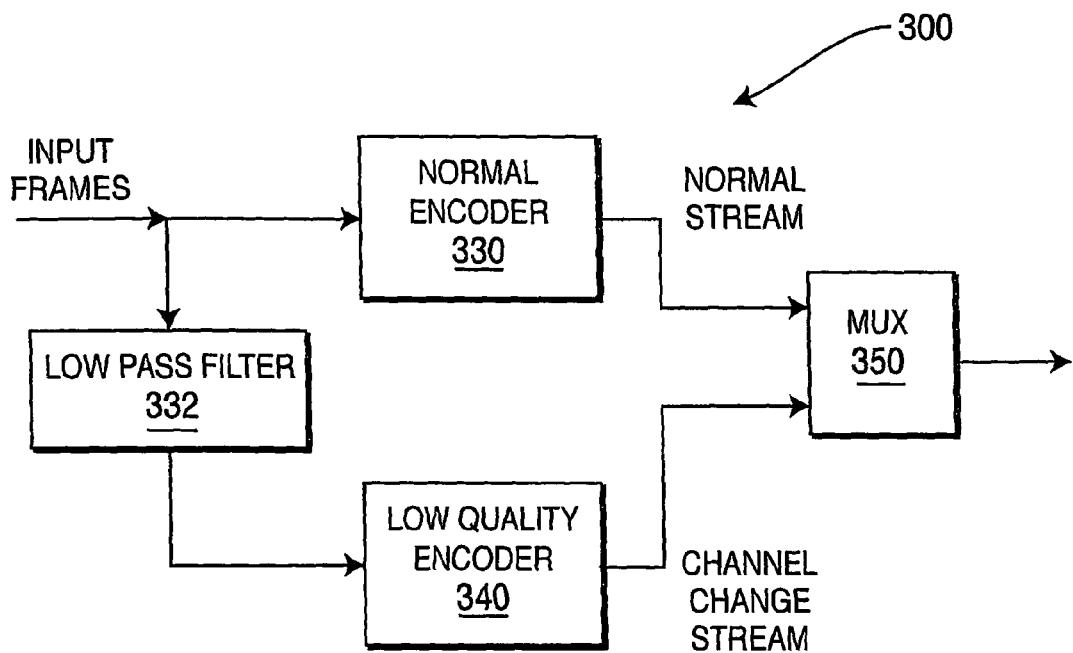
FIG. 3 shows a block diagram for an encoder using a low-pass filtered channel change stream in accordance with principles of the present invention.
FIG. 4 shows a table for an exemplary picture pattern in accordance with principles of the present invention.

Turning now to FIG. 3, an encoder in accordance with principles of the present invention is indicated generally by the reference numeral 300. The encoder 300 uses filtered data for the channel change stream, and includes a normal encoder portion 330 for producing the normal stream, and a low-pass filter 332 in signal communication with a low-quality encoder portion 340 for producing the filtered channel change stream. The normal portion 330 and the low-quality portion 340 are each coupled in signal communication with a mux 350, for providing the normal and channel change streams, respectively, to the mux 350 for output.

Thus, FIG. 3 shows an alternate encoding system, which applies a low-pass filter to the input pictures prior to the lower quality encoder. Because the pictures in the channel change stream are coded at a relatively low bitrate, they may contain visible coding artifacts. By low-pass filtering the images prior to encoding, some of these visible coding artifacts may be removed.

The multiplexor arranges the transmission time of the coded pictures such that the channel change stream I pictures are interspersed with the normal stream coded pictures. The channel change stream coded picture is preferably transmitted near the time that the normal stream picture corresponding to the same input picture is transmitted, and before any normal stream pictures that are inter-predicted with respect to that picture.

As shown in FIG. 4, an exemplary picture pattern is indicated generally by the reference numeral 400 for the case where only I pictures are included in the channel change stream, with N=12 and K=3. For an exemplary 24 fps sequence where channel change start periods of ½ second are desired, lower quality I pictures are inserted in the channel change stream every 12 pictures. Normal quality I pictures are inserted in the normal stream every 36 pictures.

Consider the case where a receiver tuned in to the channel while picture 5 was being received. The receiver would then wait until the first I picture in either stream arrived, which in this example is 12 in the channel change stream, and decode and display it. The decoded lower quality I picture 12 from the channel change stream would then be placed in the decoder's picture store, and used in decoding pictures 12-23 from the normal stream. These decoded pictures will contain drift. When normal quality P picture 24 arrives in the normal stream, the receiver may either choose to decode the normal stream's P picture 24 or the channel change stream's I picture 24. This could either be a receiver end decision, or a preference could be signaled by the encoder in the bitstream, based on which one will yield less drift. The normal stream's pictures 25-35 are then decoded, still with drift. Once the normal stream's picture 36 is received, which is an I picture, the decoder can start decoding properly without added drift for all subsequent pictures. From the viewer's perspective, for a short period after a channel change, here up to about 1.5 seconds, lower quality video is displayed, and then normal quality is displayed.

Bitrate savings versus a prior art system is achieved because the large normal stream I pictures are sent less frequently that they would be sent in a prior art system. The lower quality I pictures sent in the channel change stream are much smaller than the normal quality I pictures. An encoding system may send the lower quality I pictures in the channel change stream as frequently as desired, and with any pattern. I pictures in the normal stream also need not follow a regular pattern, and for example may be inserted whenever a scene change occurs. An encoding system does not need to insert channel change stream I pictures if the distance between I pictures in the normal stream does not exceed a desired value. The encoding system may choose to insert I pictures in the channel change stream whenever necessary to maintain a maximum I picture spacing, associated with a desired channel change delay limit, for example.

The channel change stream may contain pictures of different resolutions. For example, some of the I pictures in the channel change stream may be of the same resolution as the normal stream and others may be at a lower resolution. Alternately, two or more different lower resolutions for pictures in the channel change stream may be used.

In order to reduce the drift that occurs when decoding a normal stream picture using a channel change stream picture as a predictor, the encoder can restrict the range of allowable reference pictures for the P and B pictures that follow the normal stream picture that corresponds to the channel change stream I picture. In the JVT/H.264 video compression standard, P and B pictures may be predicted using multiple reference pictures, which provides a coding efficiency advantage over using a single reference picture. For the example in FIG. 4, a restriction may be imposed such that pictures 12-23 in the normal stream may not use reference pictures prior to picture 12. If this restriction were not imposed, more drift would occur following a channel change. For example, if picture 15 was predicted from both pictures 12 and 9, and a channel change occurred while picture 5 was being received, the decoding system would have a representation of picture 12, from the channel change stream I picture 12, but would not have any representation of picture 9. This could lead to a significant reduction in visual quality when decoding pictures 13-23. However, if a restriction were imposed that picture 15 be predicted only from picture 12, this significant drift can be avoided, with a small penalty in the coding efficiency of picture 15.

Figure 5:
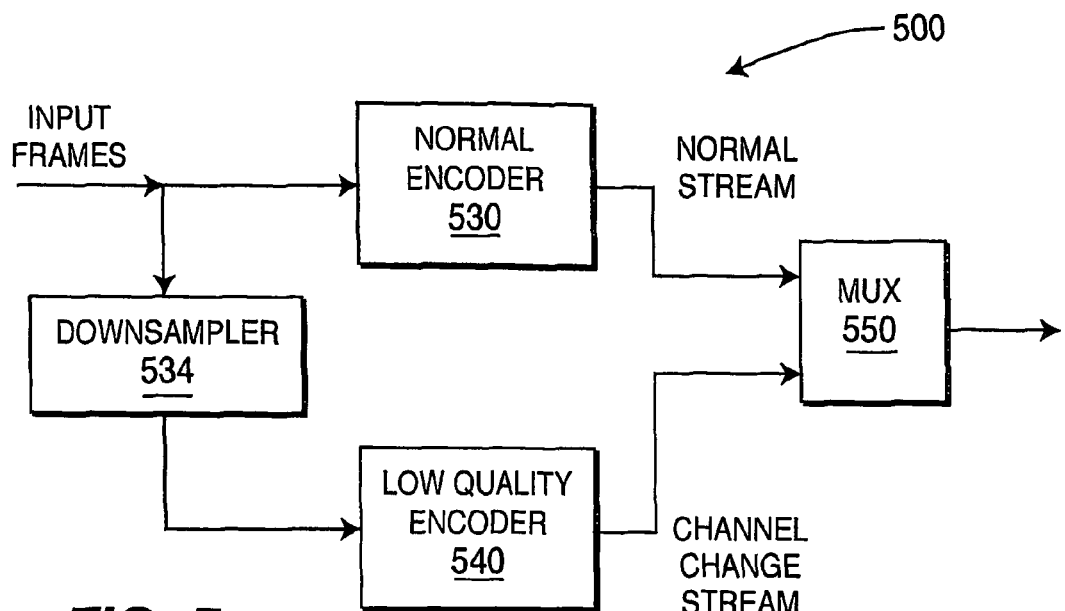
FIG. 5 shows a block diagram for an encoder using a downsampled channel change stream in accordance with principles of the present invention.

Turning to FIG. 5, an encoder in accordance with principles of the present invention is indicated generally by the reference numeral 500. The encoder 500 uses downsampled data for the channel change stream, and includes a normal encoder portion 530 for producing the normal stream, and a downsampler 534 in signal communication with a low-quality encoder portion 540 for producing the filtered channel change stream. The normal portion 530 and the low-quality portion 540 are each coupled in signal communication with a mux 550, for providing the normal and channel change streams, respectively, to the mux 550 for output.

Figure 6:
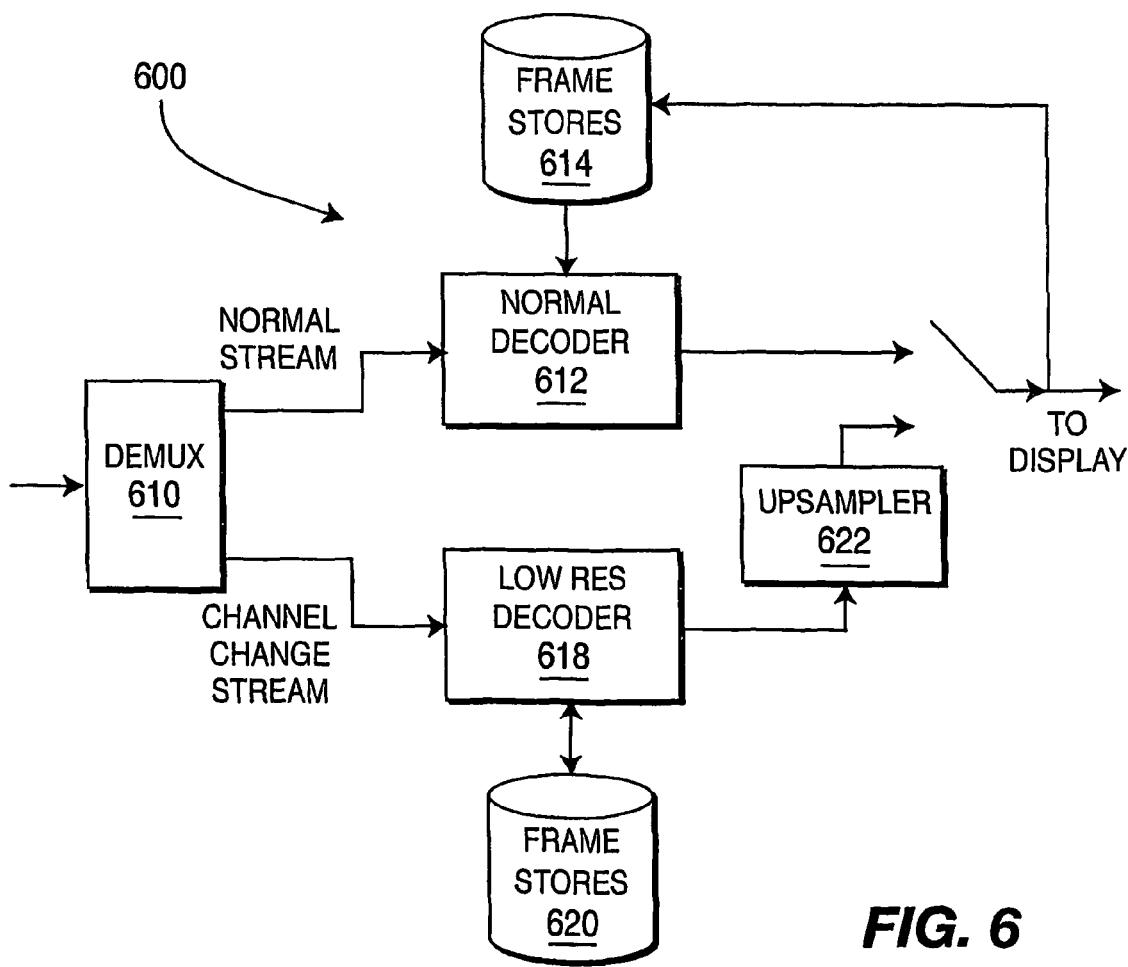
FIG. 6 shows a block diagram for a decoder using a downsampled channel change stream in accordance with principles of the present invention.

Turning now to FIG. 6, a decoder in accordance with principles of the present invention is indicated generally by the reference numeral 600. The decoder 600 uses downsampled data for the channel change stream, and includes a demux 610 for receiving compressed video data, coupled in signal communication with each of a normal decoder portion 612 and a lower resolution decoder portion 618. The normal decoder portion 612 is coupled in signal communication with frame stores 614, and selectably outputs decoded video to a display and to the frame stores 614. The lower resolution decoder portion 618 is coupled in signal communication with frame stores 620, and outputs decoded video to an upsampler 622, which, in turn, selectably outputs upsampled decoded video to a display and to the frame stores 614.

Thus, FIG. 5 shows an encoding system and FIG. 6 shows a decoding system, each of which use lower resolution images for lower quality pictures in the channel change stream than for the normal pictures. For example, 704×480 pixels could be used for the normal pictures and 352×240 pixels for the channel change pictures. The input pictures are encoded normally for the normal stream, and are resized to a lower resolution and encoded at that lower resolution for the channel change stream. The normal stream and the channel change stream are multiplexed together and transmitted. In the decoding system, a demux separates the normal stream and the channel change stream, and a selection is made as to whether the picture from the normal stream or the channel change stream should be decoded and displayed. If the channel change stream is decoded and displayed, the decoded picture is put into the normal stream decoder's picture store for use in decoding subsequent normal stream coded pictures. Although separate blocks are provided in the figure for the normal decoder and lower quality decoder, both functions may be performed using a single device as will be recognized by those of ordinary skill in the pertinent art.

In the decoding system, following a channel change, lower quality video is initially displayed, and once an I picture in the normal stream is received, normal quality video begins to be displayed. The abrupt transition from lower quality video to normal quality video may be more noticeable to a viewer than the lower quality video itself. To reduce the abruptness of the transition, a postprocessor may be added following the decoder to filter the decoded pictures. The filter strength may be adjusted over several pictures, to gradually increase the resolution or quality of the decoded pictures.

Figure 7:
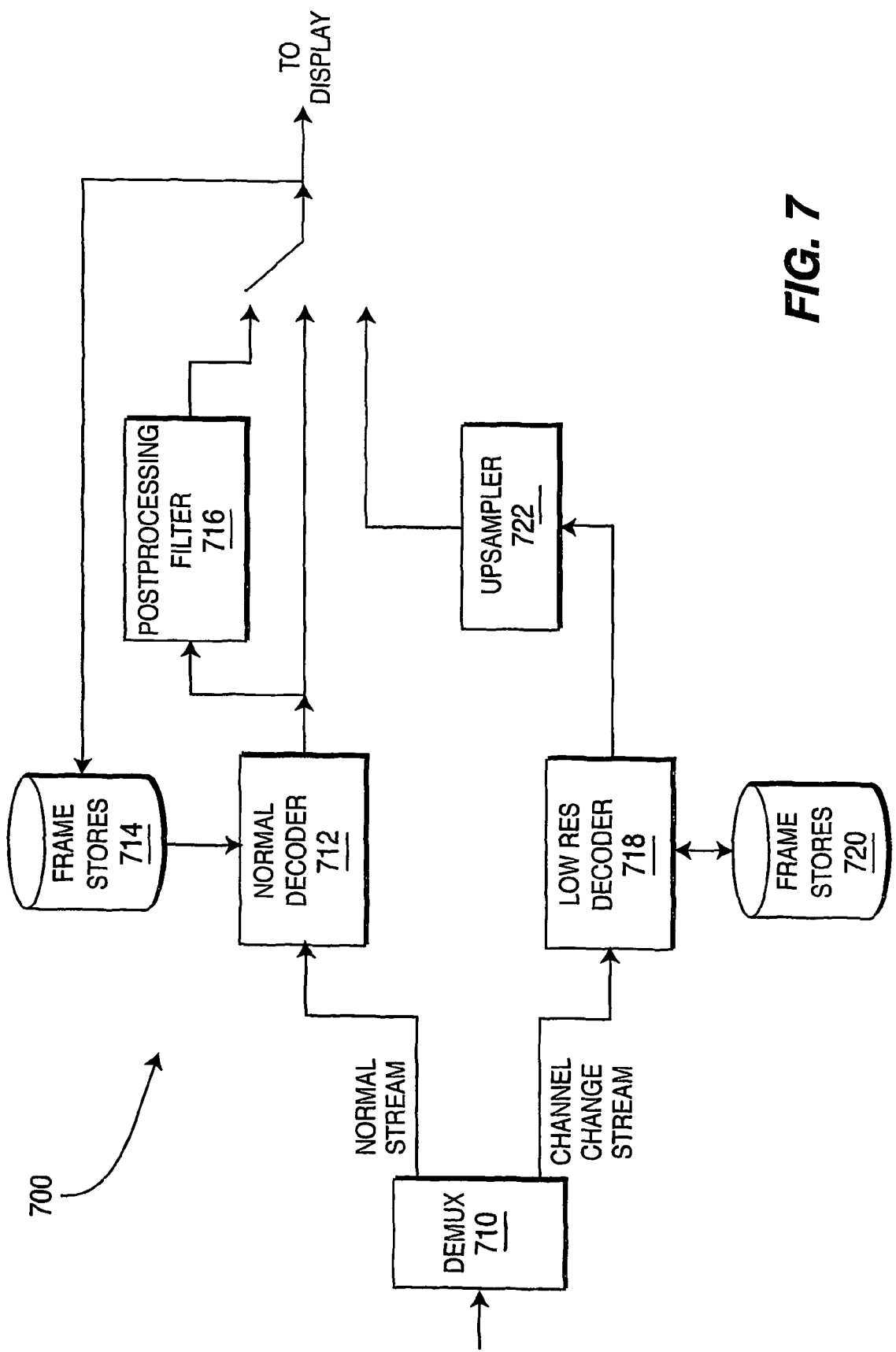
FIG. 7 shows a block diagram for a decoder using a downsampled channel change stream and a postprocessing filter in accordance with principles of the present invention.

Turning now to FIG. 7, a decoder in accordance with principles of the present invention is indicated generally by the reference numeral 700. The decoder 700 uses downsampled data for the channel change stream, and includes a demux 710 for receiving compressed video data, coupled in signal communication with each of a normal decoder portion 712 and a lower resolution decoder portion 718. The normal decoder portion 712 is coupled in signal communication with frame stores 714, and selectably outputs decoded video to a display and to the frame stores 714. The normal decoder portion 712 is further coupled in signal communication with a post processing filter 716, which selectably outputs postprocessed decoded video to the display and to the frame stores 714. The lower resolution decoder portion 718 is coupled in signal communication with frame stores 720, and outputs decoded video to an upsampler 722, which, in turn, selectably outputs upsampled decoded video to a display and to the frame stores 714.

Thus, FIG. 7 shows a decoding system that incorporates a post processing filter. A post processing function may also be added following the lower quality decoder to hide compression artifacts.

As shown in FIG. 8, a video encoding method for receiving input pictures and providing compressed stream data is indicated generally by the reference numeral 800. The method 800 includes a start block 810 that passes control to an input block 812 for receiving input pictures. The input block 812 passes control to a function block 814 for encoding normal stream data from the received input pictures. The function block 814, in turn, passes control to a function block 816 for encoding channel change stream data from the received input pictures, where the channel change stream data includes lower-quality encoded data than the normal stream data. The function block 816 passes control to a function block 818 for multiplexing the normal and channel change data streams into a combined output stream, and, in turn, passes control to an end block 820.

Turning to FIG. 9, a video decoding method for receiving compressed stream data and providing decompressed video output is indicated generally by the reference numeral 900. The method 900 includes a start block 910 that passes control to an input block 912 for receiving the compressed stream data, which passes control to a function block 914 for separating the normal stream and the channel change stream. The function block 914 passes control to a function block 916 for receiving at least one of the compressed normal and channel change streams, and providing decompressed video output. The function block 916, in turn, passes control to a function block 918 for storing reference pictures for use in decoding inter-coded pictures. The function block 918 passes control to an end block 920.

There are several possible ways in which the multiplexing of the normal steam and channel change stream may be performed. To enable a backwards compatible system where the normal stream can be decoded without alteration to pre-existing decoders, one method to is place the channel change stream's lower quality coded pictures in user data associated with the corresponding picture of the normal stream.

This method allows the decoding system to identify the picture time of a channel change stream coded picture. If this method is used, an alteration to the unique picture start code of the coded pictures in the channel change stream is necessary, such as by using bit or byte stuffing, to help the pre-existing normal decoder avoid detecting the picture start code of the channel change stream picture inside of the user data. The bit or byte stuffing procedure may be reversed in the decoding system, before passing data to a standards compliant decoder.

An alternative multiplexing method is to use a different PID for the channel change stream than for the normal stream. In this case, the channel change stream will need to include timing information for the coded pictures, synchronized with the normal stream pictures. Also, an association must be made between the PIDs of the normal stream and the channel change stream.

If the JVT/H.264/MPEG AVC compression standard is used in this system, and the resolution of the normal pictures and channel change pictures are identical, the redundant pictures syntax of JVT may be used for coding the channel change pictures by setting the redundant_pic_cnt field in the slice header to 1 for the channel change pictures. In this case, in the decoding system, the channel change stream pictures may be identified by searching for pictures containing a redundant_pic_cnt field equal to 1 in the slice header.

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof.

Most preferably, the principles of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A video decoder for receiving compressed stream data and providing decompressed video output, the decoder comprising:
    a demultiplexor for receiving the compressed stream data and separating a normal stream and a channel change stream there from, the normal stream and the channel change stream each being generated external to the video decoder and comprising a plurality of pictures for a same program;
    a normal decoding portion in direct signal communication with the demultiplexor for selectably receiving at least one of the compressed normal and channel change streams, and providing decompressed video output; and
    at least one normal frame store in signal communication with the normal decoding portion for storing reference pictures for use in decoding inter-coded pictures.

2. A video decoder as defined in claim 1, further comprising:
    a lower-resolution decoding portion in signal communication with the demultiplexor for receiving the compressed channel change stream;
    at least one channel change frame store in signal communication with the lower-resolution decoding portion for storing reference pictures;
    an upsampling unit in signal communication with the lower-resolution decoding portion for upsampling decompressed video data and selectably outputting said data to at least one of the at least one normal frame store and a display.

3. A video decoder as defined in claim 1, further comprising a postprocessing filter in signal communication with the normal decoding portion for postprocessing decompressed video data and selectably outputting said data to at least the at least one normal frame store.

4. A video decoder as defined in claim 1, further comprising means for selecting a compressed picture to decode from one of a normal stream and a channel change stream.

5. A video decoder as defined in claim 4, further comprising means for upsampling lower resolution channel change stream pictures.

6. A video decoder as defined in claim 4, further comprising means for postprocessing the output of the normal decoder to reduce the abruptness of a transition from lower-quality to normal quality output.

7. A video decoder as defined in claim 1, further comprising means for decoding redundant picture syntax in compliance with the JVT/H.264/MPEG AVC compression standard.

8. A video decoder as defined in claim 1, further comprising means for decoding channel change pictures from user data of corresponding normal stream pictures.

9. A video decoder as defined in claim 1, further comprising means for responding to a signal from an encoder indicating whether to use normal stream or channel change stream pictures for subsequent channel change stream intra-coded pictures.

10. In a video decoder, a video decoding method for receiving compressed stream data and providing decompressed video output, the method comprising:
   receiving the compressed stream data and separating a normal stream and a channel change stream there from, the normal stream and the channel change stream each being generated external to the video decoder and comprising a plurality of pictures for a same program;
   receiving at least one of the compressed normal and channel change streams, and providing decompressed video output; and
   storing reference pictures for use in decoding inter-coded pictures.

11. A video decoding method as defined in claim 10, further comprising at least one of:
   selecting a compressed picture to decode from one of a normal stream and a channel change stream;
   upsampling lower resolution channel change stream pictures;
   decoding redundant picture syntax in compliance with the JVT standard;
   decoding channel change pictures from user data of corresponding normal stream pictures;
   responding to a signal from an encoder indicating whether to use normal stream or channel change stream pictures for subsequent channel change stream intra-coded pictures; and
   postprocessing the output of the normal decoder to reduce the abruptness of a transition from lower-quality to normal quality output.

* * * * *